United States Patent [19]

Petkovich

[11] 3,998,467
[45] Dec. 21, 1976

[54] TOOL CHUCK FOR A DRILL PRESS

[76] Inventor: Tony Petkovich, 3045 W. 5th Ave., Vancouver, British Columbia, Canada, V6K 1T8

[22] Filed: Aug. 19, 1975

[21] Appl. No.: 605,891

[52] U.S. Cl. .............................. 279/37; 279/107; 294/116

[51] Int. Cl.² ................... B23B 31/16; B23B 31/18

[58] Field of Search ............ 279/35, 37, 106, 107; 294/116, 86.3, 86.31

[56] References Cited

UNITED STATES PATENTS

| | | | |
|---|---|---|---|
| 553,226 | 1/1896 | Brockett | 279/35 |
| 1,195,846 | 8/1916 | Newman | 279/35 X |
| 1,772,437 | 8/1930 | Henderson | 294/116 X |
| 1,797,836 | 3/1931 | Paul | 279/106 X |
| 1,801,456 | 4/1931 | Pryor | 294/86.31 X |
| 1,900,194 | 3/1933 | Niemi | 294/116 X |
| 3,756,645 | 9/1973 | Heinemann | 294/116 |

Primary Examiner—Othell M. Simpson
Assistant Examiner—Fred A. Silverberg
Attorney, Agent, or Firm—Fetherstonhaugh & Co.

[57] ABSTRACT

A chuck for holding a tool in a drill press includes a sleeve having an open end spaced above a workpiece to be drilled. A plurality of levers are pivotally mounted in the sleeve and the lower ends of the levers are fitted with jaws which grip the side of the tool shank entered into the sleeve. The innermost end of the tool abuts a cam member which is endwise movable in the sleeve. Springs are provided to hold inner ends of the levers in engagement with the cam member and to lightly hold the jaws against the tool shank. When the rotating tool is applied to the workpiece, the cam member is moved inwardly of the sleeve and the levers are rocked to increase the grip of the jaws upon the tool shank.

6 Claims, 3 Drawing Figures

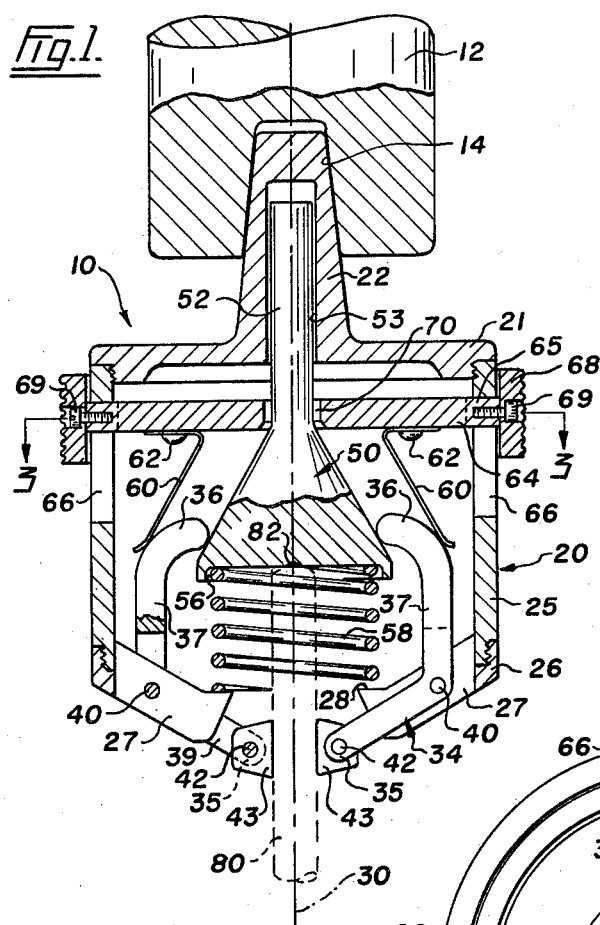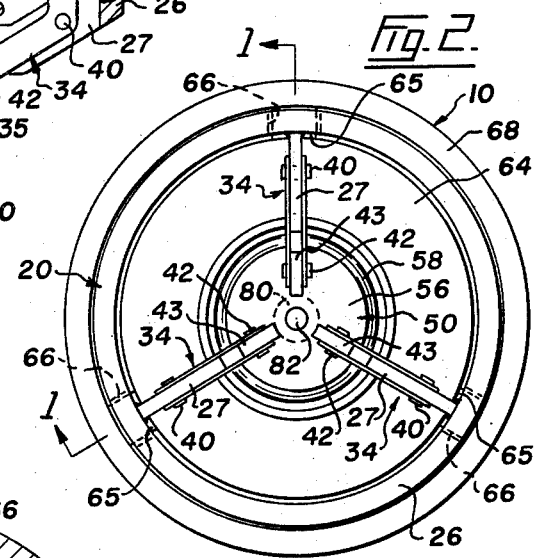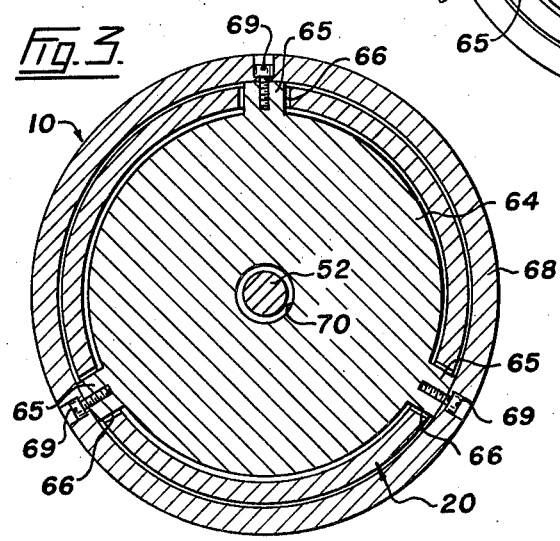

TOOL CHUCK FOR A DRILL PRESS

My invention relates to a chuck particularly intended for use in securing a drill in the spindle of a drill press.

A conventional drill chuck usually has jaws which are closed and opened to grip and release a drill by means of a key. Care must be taken to tighten the jaws with the key so that they grip the drill with sufficient pressure to avoid slipping during normal use of the tool and very often one drill size must be substituted for another call of which takes up an undesirable amount of the operator's time.

This time-consuming task is avoided by use of the present drill chuck which is constructed in such a way that a drill can simply be pushed into a position by hand where it will be gripped automatically with the amount of pressure required to prevent accidental withdrawal. When the rotating spindle is lowered to apply the drill to the work, the tool is thrust still further into the chuck with the result that a clamping force is exerted on the drill which is substantially proportional to the upwardly directed force on the tool. As a result, the drill is securely and properly supported at all times. The coupling action of the tool to the chuck is quick and easy and a simple manually operated releasing device is provided to break the grip of the jaws on the drill.

More specifically, a tool chuck for a machine having a rotatable driven part comprises a sleeve having an open end and an opposite end connectable to said machine part, a plurality of levers circumferentially spaced apart around the open end; said levers each having an outer end, an inner end and an intermediate portion; pivot means connecting the intermediate portions to the sleeve whereby the outer ends are swingable towards and away from an axis of rotation of said sleeve, an axially movable and cam member supported within the sleeve, spring means urging the inner ends into engagement with the cam member, said outer ends being movable radially with respect to the open end in response to axial movement of said cam member, said cam member having an end face adapted to be abutted by a tool inserted between and gripped by the outer ends whereby, when said machine parts is movable axially to apply the tool to a workpiece, an oppositely directed force is applied to move the cam member away from the open end thereby increasing the gripping action of the outer ends on the tool.

In drawings which illustrate a preferred embodiment of the invention,

FIG. 1 is a vertical section of a tool chuck constructed in accordance with the present invention and taken on line 1—1 of FIG. 2, FIG. 2 is a plan view of the underside of the drill chuck, and FIG. 3 is a horizontal section taken on the line 3—3 of FIG. 1.

Referring to the drawings, the numeral 10 indicates generally a chuck which is particularly intended for use in a drill press having a vertical spindle 12. This rotatable as well as vertically movable spindle 12 has a tapered recess 14 in the centre of the lower end thereof to receive the chuck 10.

The drill chuck 10 comprises a cylindrical sleeve 20 which is fitted with an upper end cap 21 and integrally formed with this end cap in a centrally disposed shank 22. This shank 22 is tapered towards its upper end to conform to the taper of the recess 14. Thus, the shank can be driven into the recess and the resulting force fit effectively connects the chuck 10 to the spindle 12 so that the two parts can be rotatably driven as one.

Lower open end 25 of the sleeve 20 is threadedly fitted with an extension ring 26 which is provided with inwardly projecting brackets 27. Preferably, there are three such brackets 27 on the extension ring spaced 120° apart and with their free ends terminating a suitable distance from the vertical axis of rotation 30 of the entire assembly.

Each bracket 27 supports a lever generally indicated at 34 and having opposite ends 35 and 36 as well as an intermediate portion 37 which is bent or cranked slightly as shown best in FIG. 1. The upper end 36 of each lever is solid but the remainder of the lever is longitudinally slotted as at 39 to straddle the bracket 27 and a horizontal and transversely extending pivot pin 40 secures the intermediate portion 37 of the lever to the supporting bracket. Another pivot pin 42 secures a jaw 43 to the lower end 35 of each lever and the inner face 43 of this jaw is slightly concave, see FIG. 2, to frictionally grip the side of the cylindrical tool. The inwardly curving upper ends 36 of the levers are rounded as shown in FIG. 1 and these ends are spaced apart a greater distance from the axis of rotation 30 of the chuck than are the jaws 43.

Mounted in the sleeve 20 is a cam member generally indicated at 50. This cone-shaped member 50 is surmounted by a cylindrical stem 52 which extends into a similarly shaped bore 53 in the shank 22. The stem 52 is slidably received in the bore 53 and the member 50 has limited endwise or axial movement with respect to the sleeve 22.

The lower face of the member 50 is recessed as at 56 and this circular and concentric recess houses one end of a compression spring 58 which is seated at the opposite end upon the horizontal portions 28 of the brackets.

The cam member 50 is urged upwardly by the spring 58 but movement in this direction is resisted by other springs 60. One such leaf spring 60 is positioned directly above each lever 34 so as to bear thereon near the upper end 36 and hold this end in contact with the cam member 50. The springs 60 are secured by rivets 62 to the underside of a plate 64 housed within the sleeve 20.

Plate 64 forms part of a means for releasing the jaws 43 from gripping engagement with a tool and the plate has diametrically opposed projections 65 which are slidably received in slots 66 formed in the sleeve 20. A serrated collar 68 is secured to the projections 65 by set screws 69. The plate 64 has a centrally disposed opening 70 and the stem 52 projects freely through this opening. Normally, the plate 64 is held by the pressure applied by the spring means 58 and 60 in the position shown in FIG. 1 which the projections 65 at the upper end of the slots 66. The springs 60 press the rounded ends 36 of the levers against the cam member 50 while the spring 58 resists the tendency of the cam member to lower within the sleeve. At this time, the jaws 43 are slightly spaced apart to receive a drill bit 80.

The shank of the bit 80 is entered between the jaws and is pushed upwardly until its bevelled upper end seats in a conical recess 82 formed in the recessed lower end 56 of the cam member. The bit is pushed home far enough to move the cam member upwardly so that the upper ends 36 of the levers are swung apart and the jaws 43 are swung inwardly into gripping engagement with the shank of the drill bit. The gripping action of the jaws 43 and the pressure applied by the springs 58 and 60 serve to hold the drill bit within the chuck by friction alone.

When the rotating spindle 20 is lowered so that the drill bit will engage and apply drilling pressure a workpiece in the drill press, the drill bit slides upwardly a short distance between the then lightly gripping jaws 43. This movement pushes the cam member 50 up as well and causes the levers to swing so that the jaws firmly grip the side of the drill bit and a hole can be drilled without likelihood of the tool slipping under any normal load. Should the drill bit encounter an obstruction, the gripping pressure applied by the jaws is such that the drill will slip slightly as is desirable if damage is to be avoided but otherwise the tool is held in some a manner that the drilling operation can be carried out without loss of rotational speed.

When the drill operation has been completed and the spindle 12 is retracted to raise the tool, it will be found that the drill bit is still tightly held by the jaws and cannot readily be removed from the chuck by hand. The releasing means is then actuated to disengage the tool and this is done by applying downward pressure on the collar 68. Cam member 50 is engaged by the downward moving collar to compress the spring 58 and allow the lever end 36 to move up the conical surface of the cam. This, of course, also allows the jaws 43 to swing out of engagement with the tool which is then released from the chuck.

From the foregoing, it will be apparent I have provided a simply and economically constructed chuck which does not require the use of a key or the like. A drill bit can be simply slipped into the chuck and drilling can be started whereupon the tool is held against rotation with a pressure substantially proportional to the downward pressure which is exerted against the work.

What I claim is:

1. A tool chuck for a machine having a rotatable driven part, comprising a sleeve having an open end and an opposite end connectable to said machine part, a plurality of levers circumferentially spaced apart around the open end; said levers each having an outer end, an inner end, and an intermediate portion, pivot means connecting the intermediate portions to the sleeve whereby the outer ends are swingable towards and away from an axis of rotation of said sleeve, an axially movable cam member supported within the sleeve, spring means urging the inner ends into engagement with the cam member, said outer ends being moved radially with respect to the open end in response to axial movement of said cam member, said cam member being shaped to move the outer ends of the levers inwardly when said cam member is moved axially in a direction away from the open end of the sleeve and to move said outer ends outwardly in cooperation with the spring means when said cam member is moved in the opposite direction, and said cam member having an end face adapted to be abutted by a tool inserted between and initially slidably held by the outer ends, whereby said tool when applied to a workpiece by axial movement of the driven part of the machine sliding between the outer ends moves the cam member axially away from the open end so that the outer ends are swung radially inwards into rotational driving engagement with the tool.

2. A took chuck as claimed in claim 1, and including releasing means accessible from the exterior of the sleeve for moving the cam member towards the open end to release the tool.

3. A tool chuck as claimed in claim 1, in which said outer end of each lever is provided with a pivotally mounted tool-gripping jaw.

4. A tool chuck as claimed in claim 2, in which said sleeve has a shank adapted to be operatively connected to the machine part, said shank having a bore open to the interior of the sleeve, and said cam member having a stem slidably received in the bore and having limited endwise movement therein.

5. A tool chuck as claimed in claim 4, in which said releasing means comprises a plate within the sleeve, said plate having an opening through which the stem freely projects, and said spring means includes a leaf spring carried by the plate to engage an adjacent inner end of each lever and a compression spring biasing the cam member away from the open end to counteract the leaf springs.

6. A tool chuck for a machine having a rotatable driven part, comprising a sleeve having an open end and an opposite end, a shank on the opposite end adapted to be connected to the machine part, a plurality of levers circumferentially spaced apart around the open end; said levers each having an outer end, an inner end, and an intermediate portion; pivot means connecting the intermediate portions to the sleeve whereby the outer ends are swingable towards and away from an axis of rotation of said sleeve, a toolgripping jaw on the outer end of each lever, an axially movable cam member supported within the sleeve, said cam member having a stem, said shank having a bore in which the stem is slidably mounted and is endwise movable, a compression spring mounted within the sleeve to bias the cam member away from the open end, a plate within the sleeve, said plunger having an opening through which the stem freely projects, a leaf spring carried by the plate to engage an adjacent inner end of each lever, a collar mounted exteriorly of the sleeve and operatively connected to the plate, and said cam member having an end face adapted to be abutted by a tool inserted between and gripped by the jaws whereby, when said machine part is moved axially to apply the tool to a workpiece, an oppositely directed force is applied to move the cam member away from the open end thereby increasing the gripping action of the jaws on the tool.

* * * * *